United States Patent
Mangold et al.

(10) Patent No.: US 6,668,324 B1
(45) Date of Patent: Dec. 23, 2003

(54) SYSTEM AND METHOD FOR SAFEGUARDING DATA WITHIN A DEVICE

(75) Inventors: Richard P. Mangold, Forest Grove, OR (US); Keith L. Shippy, Chandler, AZ (US); Jody L. Pfotenhauer, Tempe, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/460,537

(22) Filed: Dec. 13, 1999

(51) Int. Cl.[7] ................................................ G06F 11/30
(52) U.S. Cl. ...................... 713/189; 713/151; 713/165; 713/168; 713/193
(58) Field of Search ................................. 713/189, 151, 713/153, 165, 166, 167, 168, 193, 200, 201

(56) References Cited

U.S. PATENT DOCUMENTS 5,805,706 A    9/1998  Davis ........................... 380/49

*Primary Examiner*—Thomas R. Peeso
(74) *Attorney, Agent, or Firm*—Blakely, Sokoloff, Taylor & Zafman LLP

(57) ABSTRACT

A system and method of safeguarding data within a device are described. In one embodiment, at least one protocol specific encrypted data stream is received. The protocol specific encrypted data stream is translated into a protected content exchange (PCX) encrypted data stream. In addition, the PCX encrypted data stream is transferred to a decoding device and the PCX encrypted data stream decrypted.

46 Claims, 13 Drawing Sheets

SYSTEM AND METHOD FOR SAFEGUARDING DATA WITHIN A DEVICE

FIELD OF THE INVENTION

The present invention relates to data encryption. More specifically, the present invention relates to safeguarding the transfer of data within a device.

BACKGROUND

With the proliferation of computers and networks, the amount and availability of digitized data available for viewing and listening has grown. However, with this growth in the amount and availability of information, content providers have desired greater protection of the data from unauthorized use.

In order to protect data from unauthorized use, data protection techniques, such as, for example, data encryption, have been used to protect data as it is being transferred over a network or between devices. Content providers use a number of well known encryption techniques to encrypt sensitive data before transmission from one device, such as, for example, a satellite receiving dish, to a second device, such as, for example, a computer or set-top box.

Different types of encryption techniques are used depending upon the source device of the data and the type of data bus being used for the transmission from one device to another. For example, data transmitted from a Digital Video Disk (DVD) player to a computer uses Content Scrambling System (CSS) encryption, and data transmitted over an IEEE 1394 bus use Digital Transmission Content Protection (DTCP). Data transmitted over other bus systems use a number of other encryption techniques.

In order to decrypt the data as it is received, devices need to be able to decrypt data using the variety of techniques that are used to encrypt the data. Thus, a device that receives both CSS and DTCP encrypted data needs to know the techniques for decrypting both types of encrypted data.

The various encryption techniques employed only protect the data during transmission. Once the data is received, it must be decrypted in order for the receiving device to be able to process the data. Once the data is decrypted within the receiving device, the data is susceptible to unauthorized access and manipulation.

What is required is a method and system to protect data inside an open architecture device, such as, for example, a personal computer.

SUMMARY OF THE INVENTION

A system and method of safeguarding data within a device are described. In one embodiment, at least one protocol specific encrypted data stream is received. The protocol specific encrypted data stream is translated into a protected content exchange (PCX) encrypted data stream. In addition, the PCX encrypted data stream is transferred to a decoding device and the PCX encrypted data stream decrypted.

BRIEF DESCRIPTION OF THE DRAWINGS

The objects, features and advantages of the present invention will be apparent to one skilled in the art in light of the following detailed description in which.

DETAILED DESCRIPTION

Figure 1:
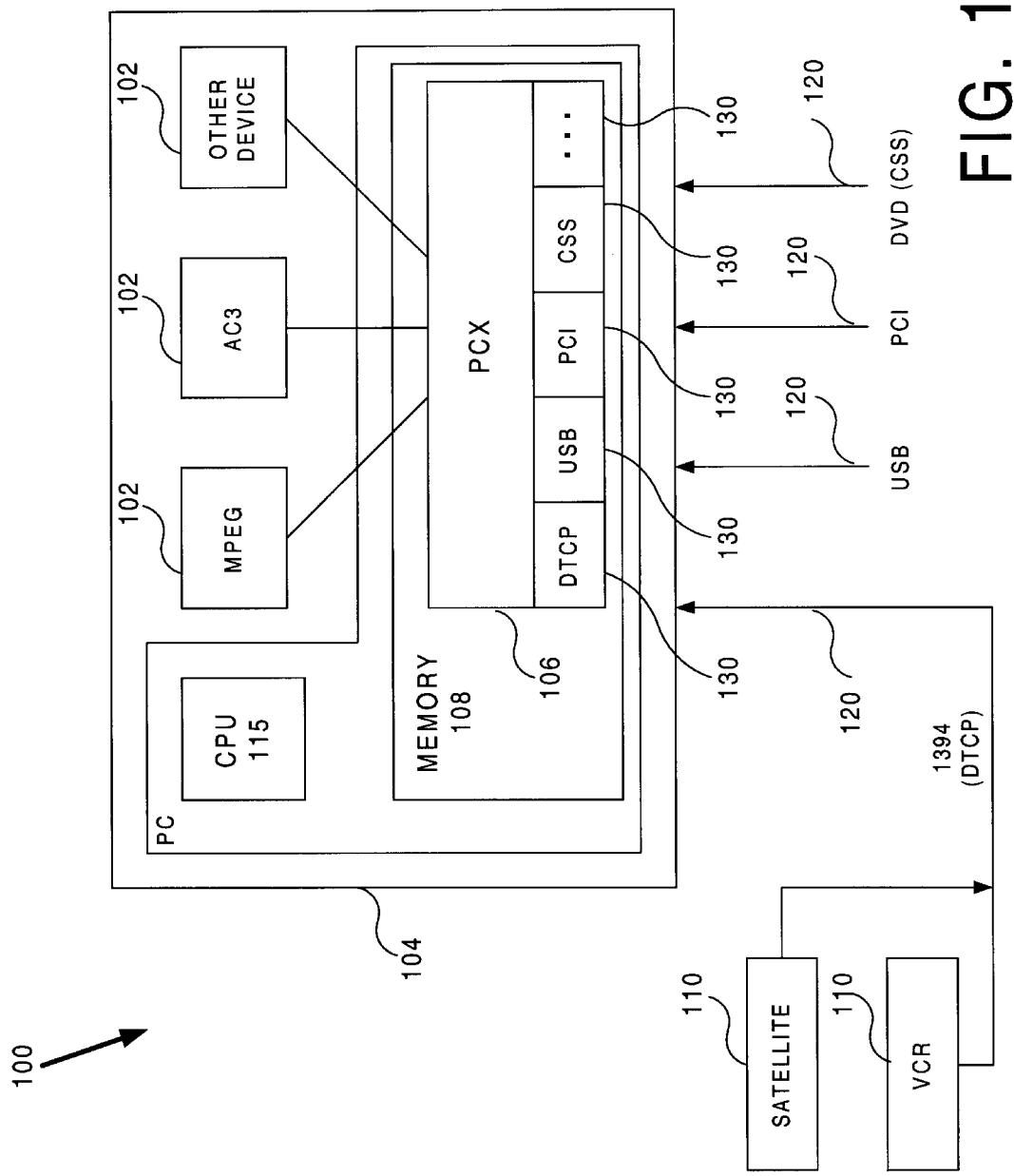
FIG. 1 is a block diagram of one embodiment for a data safeguarding system.

In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 is a block diagram of one embodiment for a data safeguarding system 100. Data safeguarding system 100 includes data safeguarding device 104, protocol specific input devices 110 and protocol specific buses 120. Data safeguarding device 104 includes decoding devices 102, a CPU 115, and a memory 108. Memory 108 includes protected content exchange (PCX) module 106. PCX module 106 includes a number of protocol specific exchange modules 130.

Protocol specific encrypted data is received over protocol specific bus 120 from protocol specific input devices 110. In the FIG. 1 example, encrypted data may be received over a 1394 DTCP bus from a number of input devices 110 such as a satellite dish or video recorder (VCR). Any of a number of protocol specific buses 120 may be connected to data safeguarding device 104 including, for example, a USB bus, a PCI bus, and a DVD bus. Once the encrypted data is received by data safeguarding device 104, CPU 115 directs the input to PCX module 106. Within PCX module 106, the appropriate protocol specific exchange module 130 is used to decrypt the encrypted input data stream. For example, if IEEE 1394 DTCP bus encrypted data is received, a DTCP exchange module 130 would be used to decrypt the input data. Input data is received and is decrypted on a block-by-block basis.

Initially, PCX module 106 negotiates a content channel encryption key with protocol specific input device 110. PCX module 106 then negotiates a PCX session key with the client decoding device 102. Decoding device 102 is the client that, in one embodiment, originally requested the data from device 110. Once the PCX session key is negotiated, PCX module 106 reencrypts the payload of the protocol specific data using a randomly generated PCX content key and transfers the reencrypted data (including header and payload) to the appropriate decoding device 102. Once decoding device 102 receives the reencrypted data, decoding device 102 negotiates with the PCX module 106 to retrieve the PCX content key encrypted by the PCX session key. Once the appropriate PCX content is retrieved, decoding device 102 decrypts the payload data. Decoding device 102 then manipulates the unencrypted data. In one embodiment, decoding device 102 decodes the unencrypted data. For example, if MPEG data is requested by an MPEG decoder, the appropriate input device 110 sends the data over the bus 120 to data safeguarding device 104. CPU 115 executes the PCX module 106 which decrypts the MPEG input data stream using a content channel encryption key for the bus 120. The MPEG decoder and PCX module 106 negotiate a PCX session key. The payload MPEG data is reencrypted with the randomly generated PCX content key and the reencrypted data is sent to the MPEG decoder. PCX module 106 encrypts the PCX content key with the PCX session key. The MPEG decoder retrieves the encrypted PCX content key and decrypts the PCX content key with the PCX session key. In addition, the MPEG decoder uses the PCX content key to decrypt the payload data for playback. The MPEG decoder then retrieves the device key and decrypts the payload data for playback.

In one embodiment, data within system 100 is further protected from tampering or from unauthorized access by the use of a number of anti-tampering techniques such as, for example, self-modification of PCX module 106 code, the use of anti-debugging techniques, self-verification of PCX module 106 code, signature verification of PCX module 106 code, and other applicable anti-tampering techniques. The use of these anti-tampering techniques prevents unauthorized access or modification of PCX module 106 code which prevents the unauthorized access or modification of the data as it is being transferred through system 100.

Figure 2:
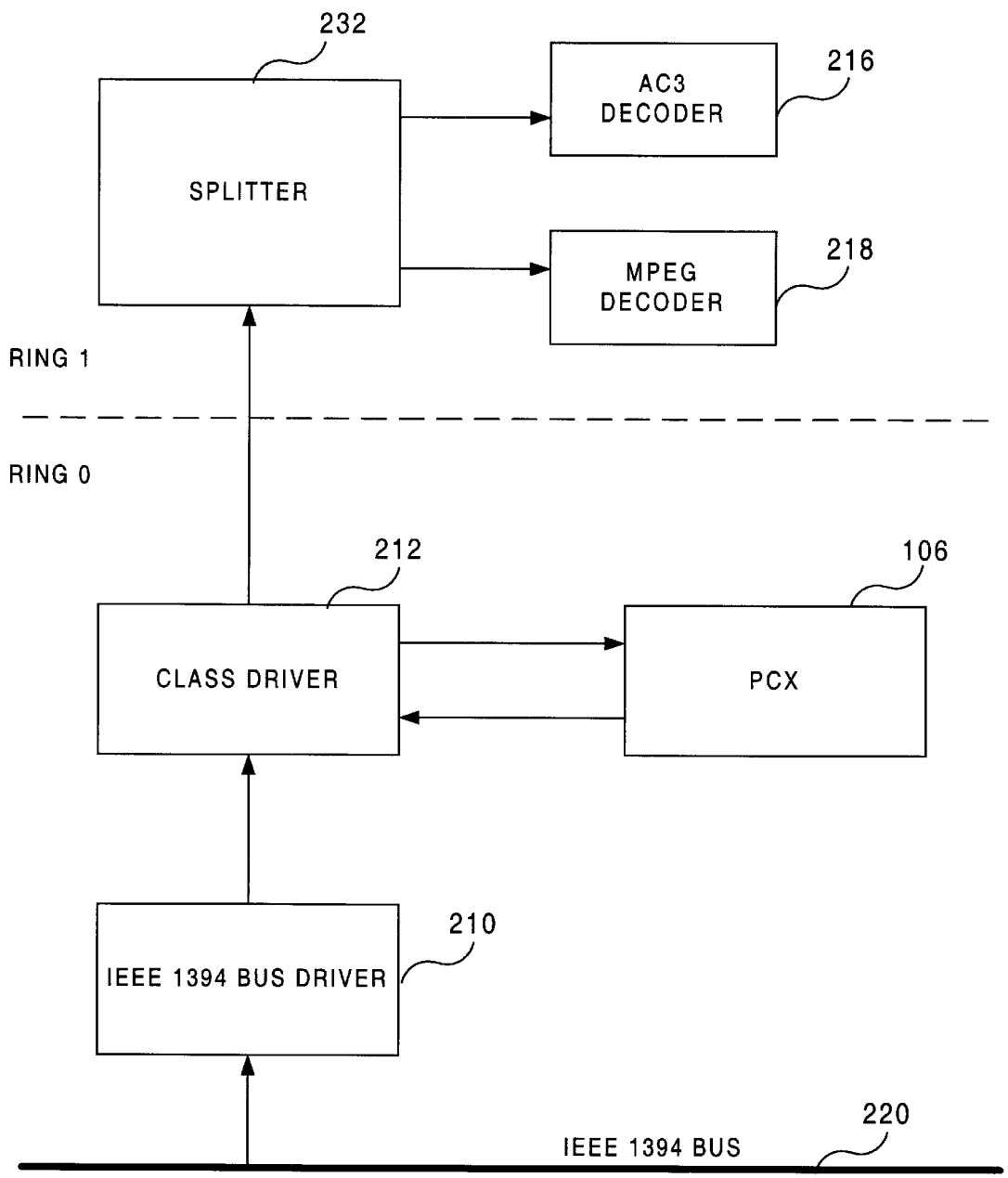
FIG. 2 is a block diagram of one embodiment for an architecture of a data safeguarding system.

FIG. 2 is a block diagram of one embodiment for an architecture of a data safeguarding system 100. Referring to FIG. 2, encrypted protocol specific data is received over IEEE 1394 bus 220 and transferred to IEEE 1394 bus driver 210. Bus driver 210 then sends the protocol specific data to class driver 212. PCX module 106 intercepts the protocol specific data and decrypts the data with a content channel encryption key. The content channel encryption key has originally been negotiated between PCX module 106 and protocol specific input device 110 before transmission. Once the data is decrypted, PCX module 106 reencrypts only the MPEG portion of the payload of the data with a randomly generated PCX content key and encrypts the PCX content key with the appropriate PCX session key. This is repeated for the AC3 portion of the payload with a different randomly generated key and a different PCX session key. PCX module 106 sends the reencrypted data back to class driver 212. The reencrypted data is transferred to a splitter 232 which splits the data between the various decoding devices. In the FIG. 2 example, the splitter 232 splits the IEEE 1394 reencrypted data to AC3 device 216 and MPEG device 218. MPEG decoder 218 and AC3 decoder 216 receive the appropriate encrypted PCX content key. MPEG decoder 218 and AC3 decoder 216 decrypt their PCX content key with their PCX session key. MPEG device 218 and AC3 device 216 then decrypt the reencrypted data for playback using the appropriate PCX content key.

Thus, the data is protected from unwarranted hacking or copying within data safeguarding system 100. Within data safeguarding system 100, the transmission headers of the data are left decrypted while the payload of the data is reencrypted by PCX module 106. Thus, the payload of the data is protected from unwarranted copying or hacking during transfer within system 100 while allowing untrusted components to access the portions of the data stream they need.

Figure 3:
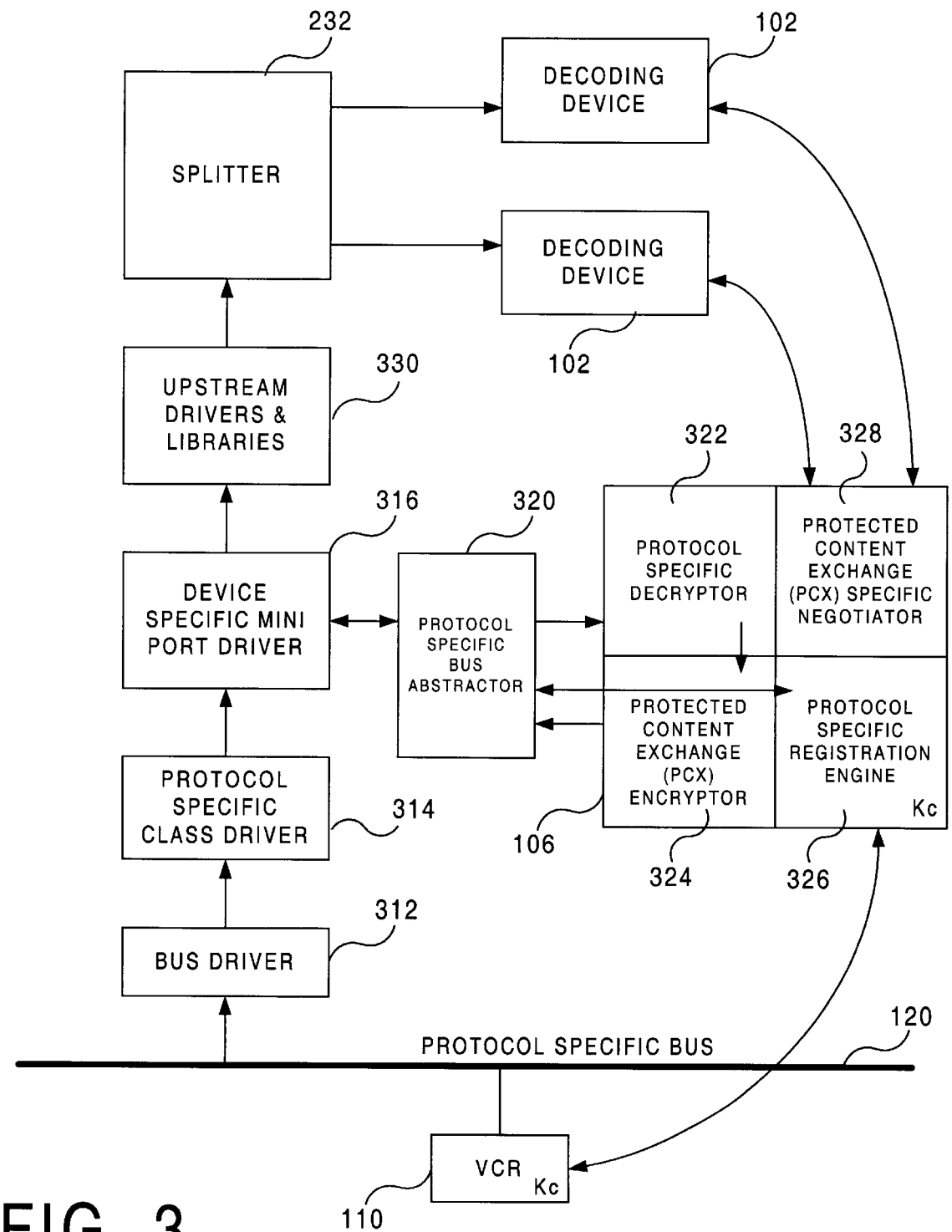
FIG. 3 is a block diagram of another embodiment for an architecture of a data safeguarding system.

FIG. 3 is a block diagram of another embodiment of an architecture of a data safeguarding system 100. Referring to FIG. 3, protocol specific input device 110 initially negotiates a content channel encryption key with protocol specific registration engine 326. Protocol specific input device 110 transmits the encrypted protocol specific data via protocol specific bus 120 to bus driver 312. Bus driver 312 transfers the encrypted protocol specific data to device specific mini port driver 316 via protocol specific class driver 314. Protocol specific bus abstractor 320 abstracts the encrypted protocol specific data from device specific mini port driver 316. The extracted encrypted data is transferred to PCX module 106. Within PCX module 106, the encrypted protocol specific data is decrypted using protocol specific decryptor 322. Protocol specific decryptor 322 decrypts the protocol specific data one block at a time. Each block of data contains a transmission header portion and a payload. In one embodiment, both the transmission header and payload portions are encrypted during transmission from source device 110 to data safeguarding system 100. In an alternate embodiment, only the payload may be encrypted. Depending on the specific data bus transmission protocol being used, protocol specific decryptor 322 decrypts either the entire data block or the payload only.

Each data bus transmission protocol requires a corresponding protocol specific decryptor 322. PCX negotiator 328 negotiates a PCX session key with the decoding device 102 that is the intended recipient of the protocol specific data. Once a session key is negotiated, protected content exchange (PCX) encryptor 324 reencrypts the payload portion of the data with a randomly generated PCX content key to produce reencrypted data. PCX encryptor 324 transfers the reencrypted data to protocol specific bus abstractor 320 which, in turn, transfers the reencrypted data to device specific mini port driver 316. Device specific mini port driver 316 sends the PCX reencrypted data to the upstream drivers and libraries 330 which in turn transfers the PCX reencrypted data to splitter 232.

Splitter 232 reads the transmission header of each reencrypted data block and transfers the data block to the decoding device 102 corresponding to the information contained within the transmission header. In addition, in one embodiment, splitter 232 removes the transmission headers from the data block. Within the data, data blocks are intermingled so that a variety of data blocks are received by splitter 232. Thus, a video block may be received, then an audio block, then another video block, and so forth. The splitter transfers the payload sections of the blocks to the corresponding decoding device as indicated by the transmission header.

Once the reencrypted payload data is received by a decoding device 102, decoding device 102 retrieves the encrypted PCX content key from PCX negotiator 328. Decoding device 102 decrypts the content key using its PCX session key which was originally negotiated with PCX negotiator 328. The unencrypted data is then consumed by decoding device 102.

Figure 4:
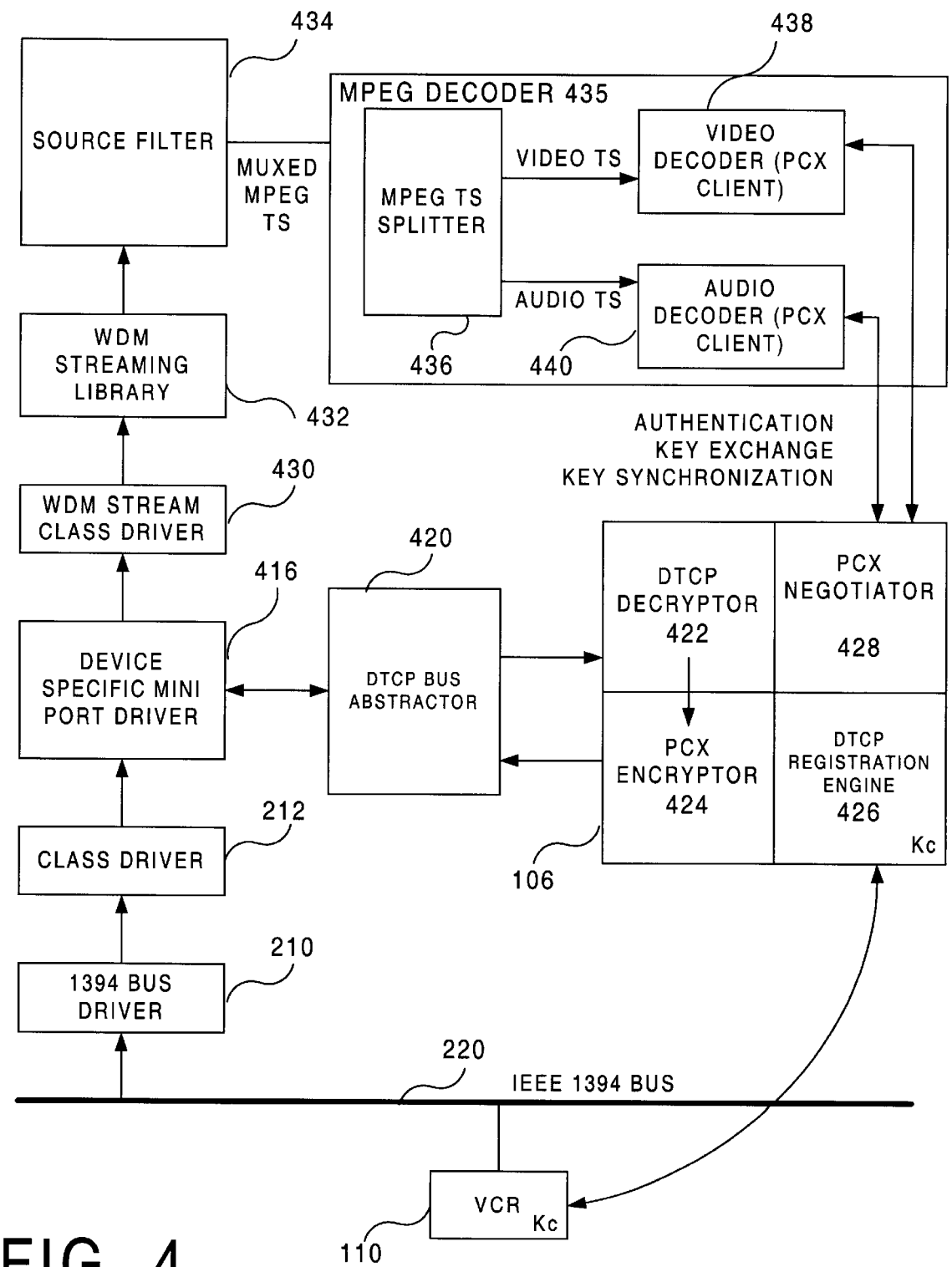
FIG. 4 illustrates an exemplary architecture of a data safeguarding system, such as that shown in FIG. 2.

FIG. 4 illustrates an exemplary architecture of safeguarding system 100. Referring to FIG. 4, protocol specific input device 110, such as a VCR, negotiates with a playback device such as MPEG decoder 435 to transmit a stream of encrypted data to MPEG decoder 435. Protocol specific input device 110 initiates the transmission of a stream of encrypted protocol specific data marked with the appropriate copy protection status (i.e., "copy-1-generation," "copy-never," or "no-more-copies"). The copy protection status is transmitted via the encryption mode indicator (EMI) bits within the transmission header of the data. If data requested by decoding device 102 (such as an MPEG decoder 435) is copy protected, protocol specific input device 110 may choose to transmit an empty data stream until at least one decoding device 102 has completed the appropriate authentication procedure required to access the content stream. Within data safeguarding system 100, protocol specific input device 110 negotiates authentication through PCX negotiator 328 and not directly with protocol specific input device 110. In the FIG. 4 example, VCR 110 negotiates authentication with DTCP registration engine 426. Once protocol specific input device (VCR) 110 and DTCP registration engine 426 have completed the required AKE procedure, a content channel encryption key may be exchanged between protocol specific input device 110 and DTCP registration engine 426. This content channel encryption key is used to encrypt the data by protocol specific input device 110 and decrypt the IEEE 1394 encrypted data by DTCP decryptor 422.

Once the content channel encryption key is negotiated, IEEE 1394 encrypted data is transferred from protocol specific input device 110 via IEEE 1394 bus driver 210, to class driver 212 and eventually to device specific mini port driver 416. DTCP bus abstractor 420 abstracts the IEEE 1394 encrypted data from device specific mini port driver 416 and transfers the IEEE 1394 encrypted data to PCX module 106. The IEEE 1394 encrypted data is decrypted by DTCP decryptor 422 one block at a time using the content channel encryption key previously negotiated by DTCP registration engine 426. In the IEEE 1394 example, both the transmission headers and the payload are encrypted by protocol specific input device 110. Thus, DTCP decryptor 422 decrypts both the transmission header and payload portions of the IEEE 1394 encrypted data block.

If video decoder 438 has not previously registered with PCX module 106, PCX negotiator 428 authenticates video decoder 438. During authentication, video decoder 438 is registered with PCX negotiator 428 and video decoder 438 negotiates a key exchange with PCX negotiator 428. The key exchange method between video decoder 438 and PCX negotiator 428 is similar to the key exchange method between decoding device 110 and DTCP registration engine 426 described above. Once a session key is negotiated between video decoder 438 and PCX negotiator 428, PCX encryptor 424 encrypts the payload of the data blocks using a randomly generated PCX content key. The reencrypted IEEE 1394 data blocks are transferred to DTCP bus abstracter 420 for transfer to device specific mini port driver 416. The reencrypted IEEE 1394 data is transferred via WDM stream class driver 430 and WDM streaming library 432 to source filter 434. At source filter 434, reencrypted IEEE 1394 data intended for MPEG decoder 435 is split off from the other IEEE 1394 data and transferred to MPEG decoder 435. The reencrypted IEEE 1394 data is muxed as MPEG transport stream (TS) to MPEG TS splitter 436. MPEG TS splitter 436 splits the video and audio portions of the MPEG TS and removes the transmission headers. The video portion of the TS is transferred to video decoder 438. Video decoder 438 requests the PCX content key from PCX negotiator 428. PCS negotiator 428 encrypts the PCX content key with the appropriate PCX session key and transfers it to video decoder 438. Video decoder 438 decrypts the PCX content key using the previously negotiated PCX session key and used the content key to decrypt the video data. In addition, the video decoder 438 consumes the data. In a similar manner, audio decoder 440 receives the audio TS and decodes the audio TS with a device key retrieved from PCX negotiator 428.

In standard MPEG video, the audio and video blocks are interwoven together within the input data stream. In order to separate the data, the MPEG splitter 436 reads the transport stream headers. Within data safeguarding system 100, MPEG decoder 435 only needs to use the PCX specific protocols in order to interact with PCX negotiator 428 and does not need to be able to use each individual data bus transmission protocol. PCX module 106 is able to translate the encrypted protocol specific data from any specific bus into PCX encrypted data that the MPEG decoder 435 is able to understand and decode. Thus, the reencryption of the protocol specific data by PCX module 106 is independent of any specific bus protocol used by system 100. Decoding devices 102 are independent of the command protocol of the specific bus. The bus abstractor 420 abstracts the DTCP status structure, encapsulates the status structure in the proper command protocol, and transmits the encapsulated protocols to the driver 416 and vice versa. In this manner, decoding devices 102 are capable of receiving encrypted data from any protocol specific bus 120 without negotiating the content channel encryption key with the input devices 110 or knowing the encryption protocol for the specific buses 120. As existing bus protocols change and new bus protocols are developed, PCX module 106 may be updated. However, decoding devices 102 only need to be able to talk with PCX module 106 and only need to be updated when the PCX module 106 negotiation protocols are updated.

PCX module 106 may be implemented in software or hardware. The PCX module 106 may be incorporated within RAM memory of a personal computer or may be contained within flash memory which is attached to a CPU or other data processing device. Thus, PCX module 106 is easily updated independent of decoding devices 102.

Figure 5:
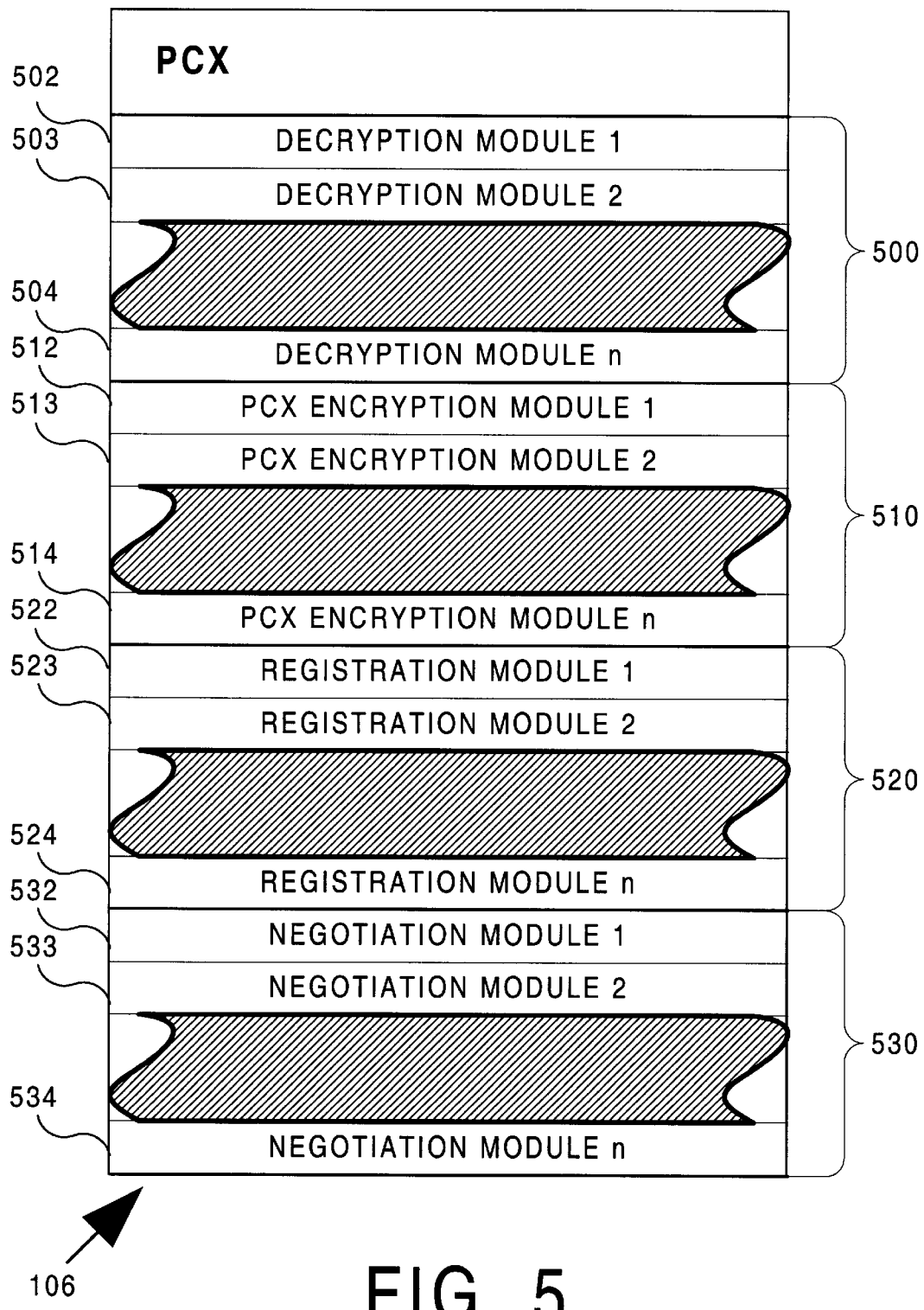
FIG. 5 is a block diagram of one embodiment for a protected content exchange (PCX) module of FIG. 2.

FIG. 5 is a block diagram of one embodiment for a protected content exchange (PCX module 106). Referring to FIG. 5, PCX module 106 contains protocol specific decryption modules 500, PCX encryption modules 510, protocol specific registration modules 520, and PCX negotiation modules 530. A protocol specific decryption module 500 may be maintained for each protocol specific bus connected to data safeguarding system 100. Thus, PCX module 106 may contain decryption module 1 (502) through decryption module n (504). PCX module 106 may contain a number of PCX encryption modules 510. Thus, PCX module 106 may contain PCX encryption module 1 (512) through PCX encryption module n (514) for the encryption of a number of devices. In an alternate embodiment, only one PCX encryption module 510 may be maintained.

PCX module 106 includes a number of registration modules 520 for the negotiation of content channel encryption keys with protocol specific input devices 110. In one embodiment, PCX module 106 may contain registration module 1 (522) through registration module n (524) corresponding to each protocol specific bus connected to the system.

PCX module 106 contains PCX negotiation modules 530 which are utilized by data safeguarding system 100 to negotiate key exchanges with decoding devices 102. In addition, the negotiation modules authenticate the decoding devices and maintain key synchronization between PCX module 106 and decoding devices 102. In one embodiment, PCX module 106 includes from negotiation module 1 (532) through negotiation module n (534) corresponding to individual decoding device 102.

Figure 6A:
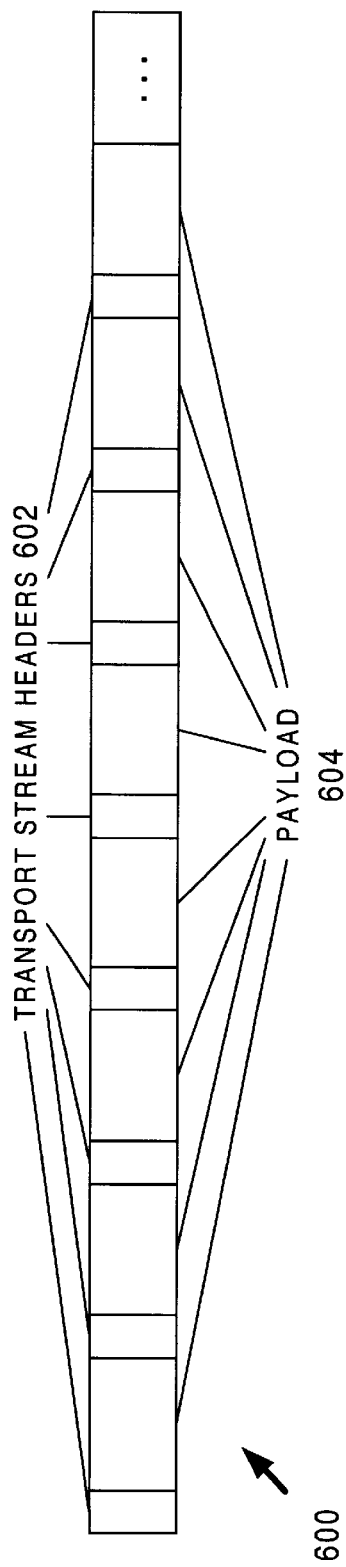
FIG. 6a is a block diagram of one embodiment for an encrypted data stream.

FIG. 6A is a block diagram of one embodiment for an encrypted data stream 600. Referring to FIG. 6A, encrypted data stream 600 contains a number of blocks of data, each block containing a transport header 602 and a payload 604. In one embodiment, the payload 604 and the transport stream header 602 may be 188 bytes in length. Within the encrypted data stream 600, each block of data may be for a different device 102. For example, MPEG audio and video data may be interleaved within encrypted data streams 600. In addition, MPEG audio and video data may be interleaved with AC3 and other data.

Figure 6B:
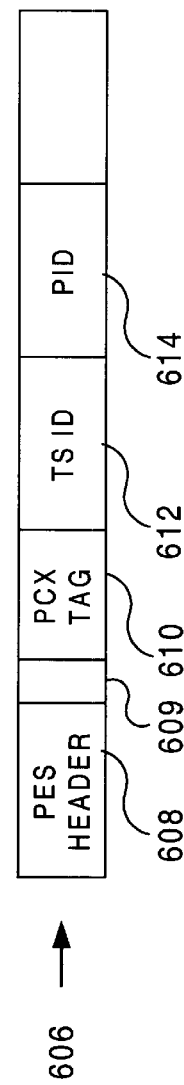
FIG. 6b is a block diagram of one embodiment for a PCX replacement payload.

FIG. 6B is a block diagram of one embodiment for a PCX replacement payload 606. Referring to FIG. 6B, the replacement payload 606 includes a header portion 608, a PCX flag 609, a PCX tag 610, a transport stream identification (TSID) 612 and a device identification (PID) 614. In one embodiment, the header 608 is a packetized elementary stream (PES) header. The replacement payload 606 is utilized for key synchronization as described below. Transport stream identification 612 is used to identify substreams in a particular data stream, for example MPEG video and AC3 audio. Device identification 614 identifies the protocol specific input device 110 transporting the protocol specific data. Device identification 614 and the transport stream identification 612 are used to uniquely identify the PCX content key used to encrypt the payload.

Figure 7:
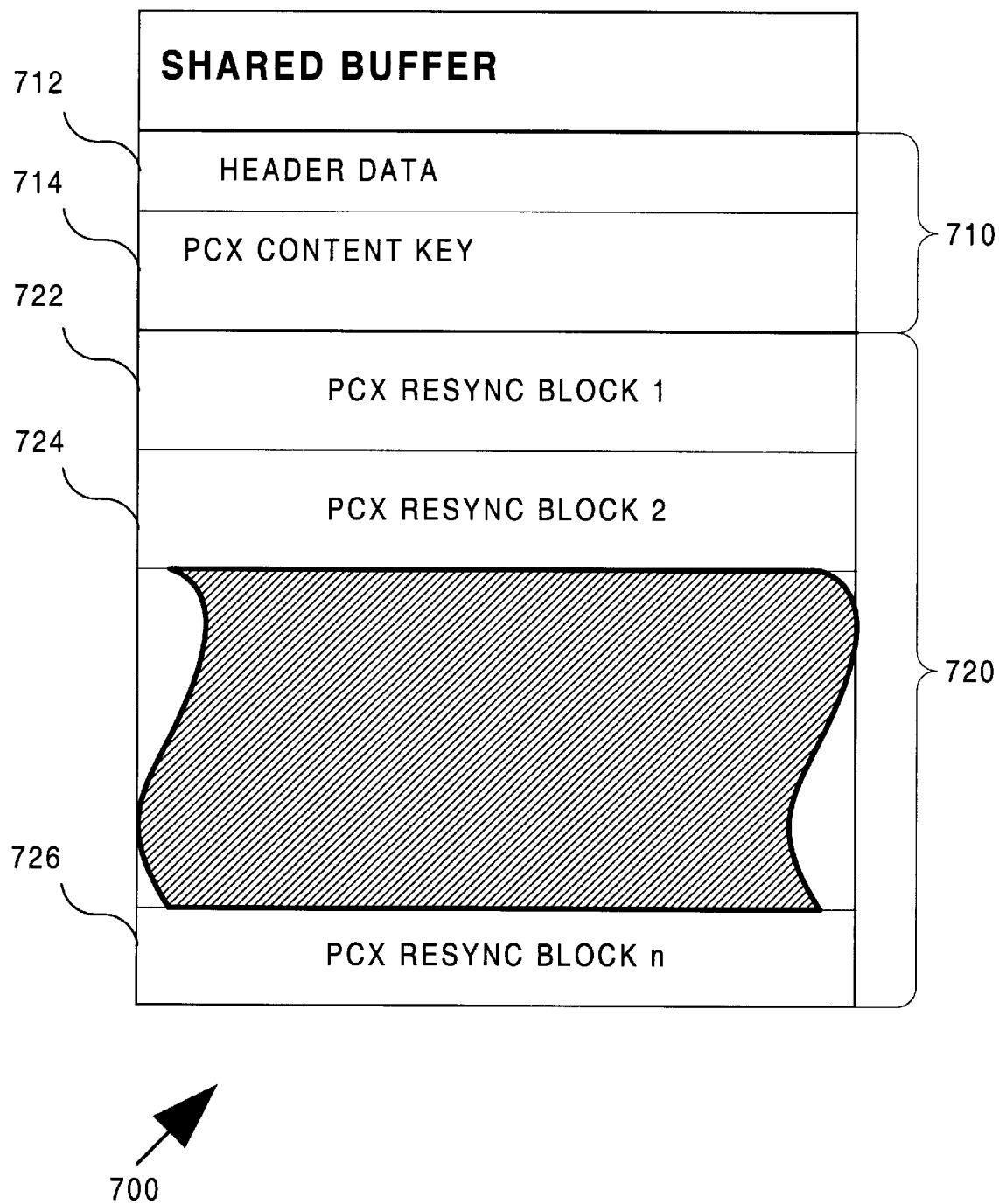
FIG. 7 is a block diagram of one embodiment for a shared buffer.

FIG. 7 is a block diagram of one embodiment for a shared buffer 700. Shared buffer 700 includes a device specific header 710 and PCX resync blocks 720. Device specific header 710 includes a header data portion 712 and PCX content key 714.

In one embodiment, PCX resync blocks 720 contain from PCX resync block 1 (722) through PCX resync block n (726). Header data 712 identifies the decoding device 102 corresponding to the shared buffer 700. In one embodiment, each decoding device 102 corresponds to a unique shared buffer 700. In an alternate embodiment, all decoding device 102 use a single, shared buffer 700. Shared buffer 700 may be any applicable data structure such as, for example, an array, linked list, or other applicable data structure.

PCX content key 714 is encrypted with the previously negotiated PCX session key and is the key that will be used to decrypt the payload.

Figure 8:
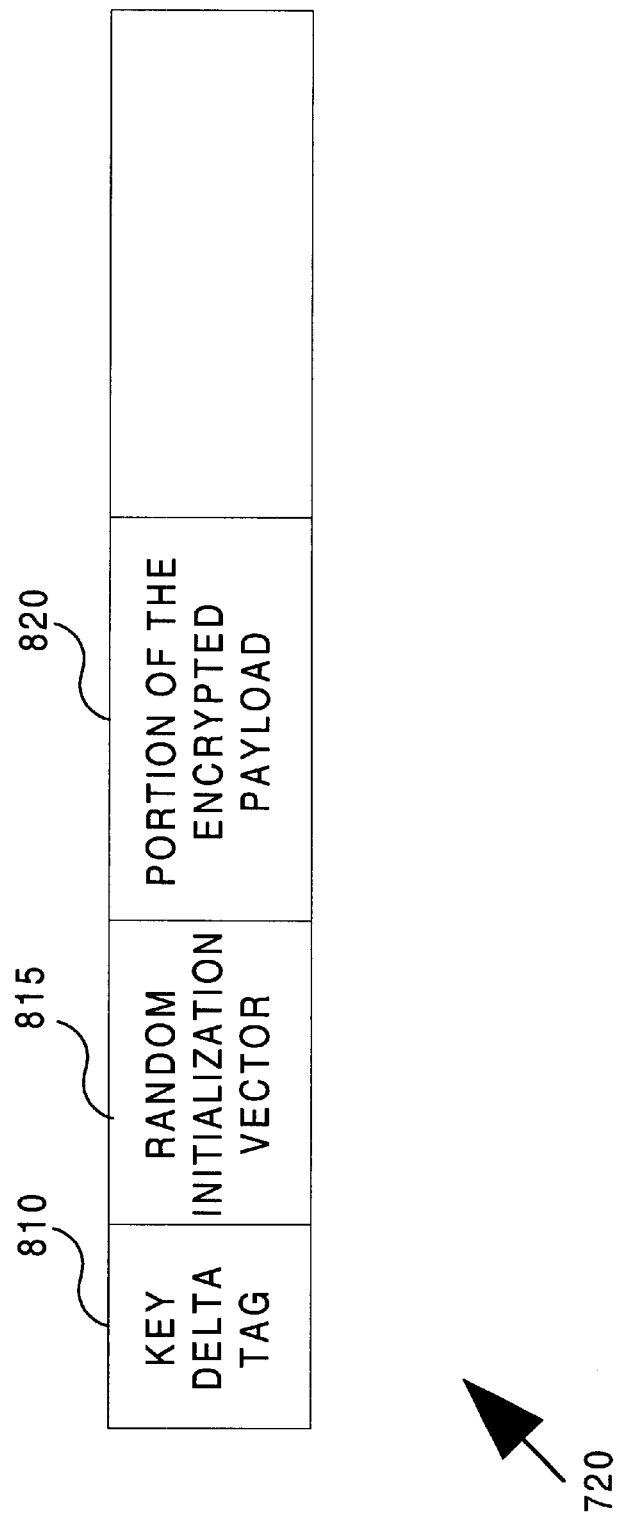
FIG. 8 is a block diagram of one embodiment for a PCX resync block.

FIG. 8 is a block diagram of one embodiment for PCX resync block 720. Referring to FIG. 8, PCX resync block 720 includes key delta tag 810, random initialization vector 815, and portion of the encrypted payload data 820. PCX resync block 720 is utilized for key synchronization as described below.

Figure 9:
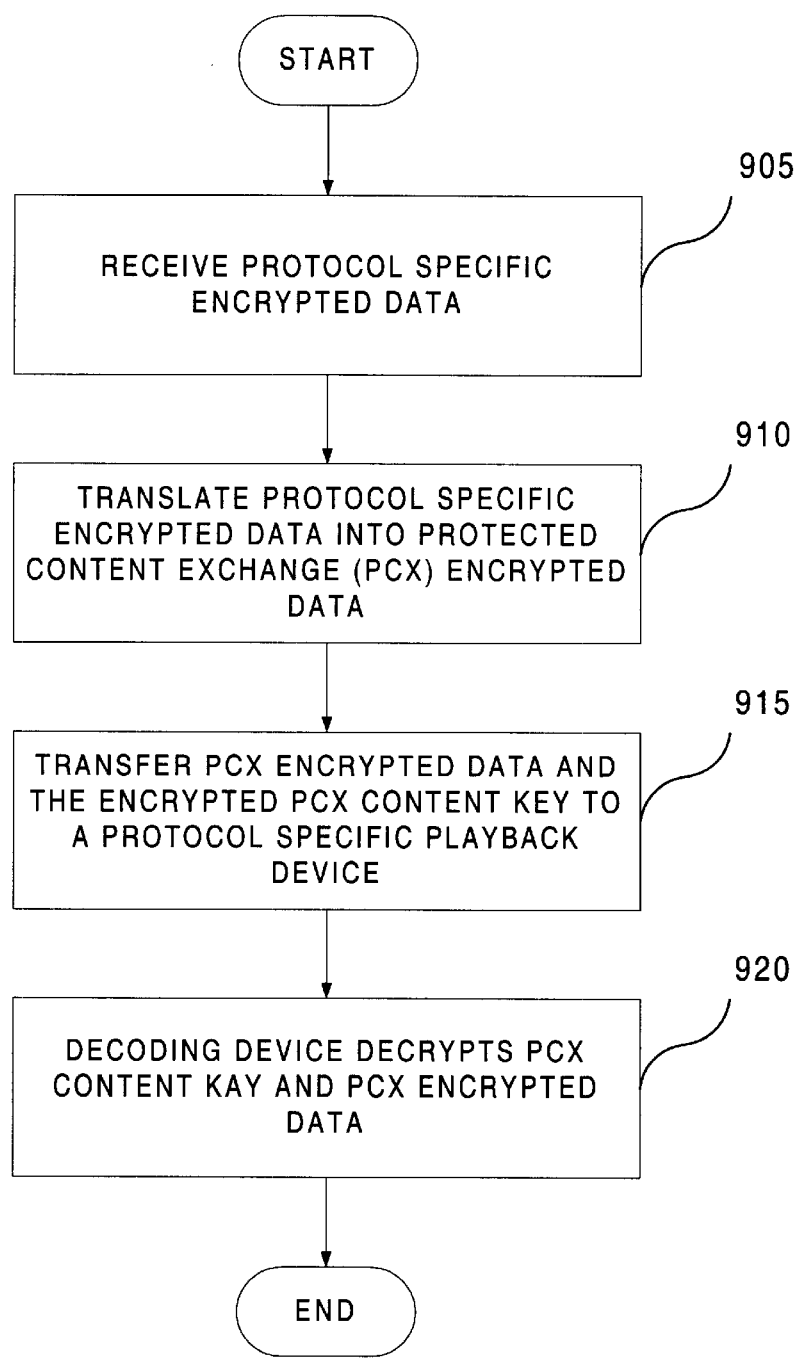
FIG. 9 is a flow diagram of one embodiment for safeguarding protocol specific data within a device.

FIG. 9 is a flow diagram of one embodiment for safeguarding protocol specific data within a device. Initially at processing block 905, data safeguarding system 100 receives encrypted protocol specific data. The encrypted protocol specific data may be encrypted for any of a variety of data bus security protocols such as, but not limited to Digital Transmission Content Protection (DTCP), Content Scramble Systems (CSS), and Content Protection for Recordable Media (CPRM). The protocol specific data is received in processing blocks one block at a time.

At processing block 910, the encrypted protocol specific data is translated into protected content exchange (PCX) reencrypted data. The translation of the data includes decrypting the encrypted protocol specific data using a content channel encryption key to produce decrypted data. Once the data is decrypted, the payload of the decrypted data is reencrypted using a PCX content key to produce PCX reencrypted data. The content channel encryption key is negotiated by a protocol specific registration engine 326 with protocol specific input device 110 upon initiation of the transfer of protocol specific data from the protocol specific input device 110 to decoding device 102. Once protocol specific input device 110 and protocol specific registration engine 326 have completed the required AKE procedure, a content channel encryption key may be exchanged between protocol specific input device 110 and protocol specific registration engine 326. This content channel encryption key is used to encrypt the data by protocol specific input device 110 and decrypt the encrypted protocol specific data by protocol specific decryptor 322. The session key is negotiated between PCX negotiator 328 and decoding device 102.

After the data is reencrypted, the reencrypted data and the PCX content key encrypted by the PCX session key are transferred to the decoding device 102 at processing block 915. In one embodiment, the reencrypted data is split into a number of data streams which are transferred to appropriate decoding devices 102.

At processing block 920, decoding device 102 decrypts the PCX content key and uses it to decrypt the reencrypted data. The unencrypted data is further decoded by decoding device 102.

Figure 10:
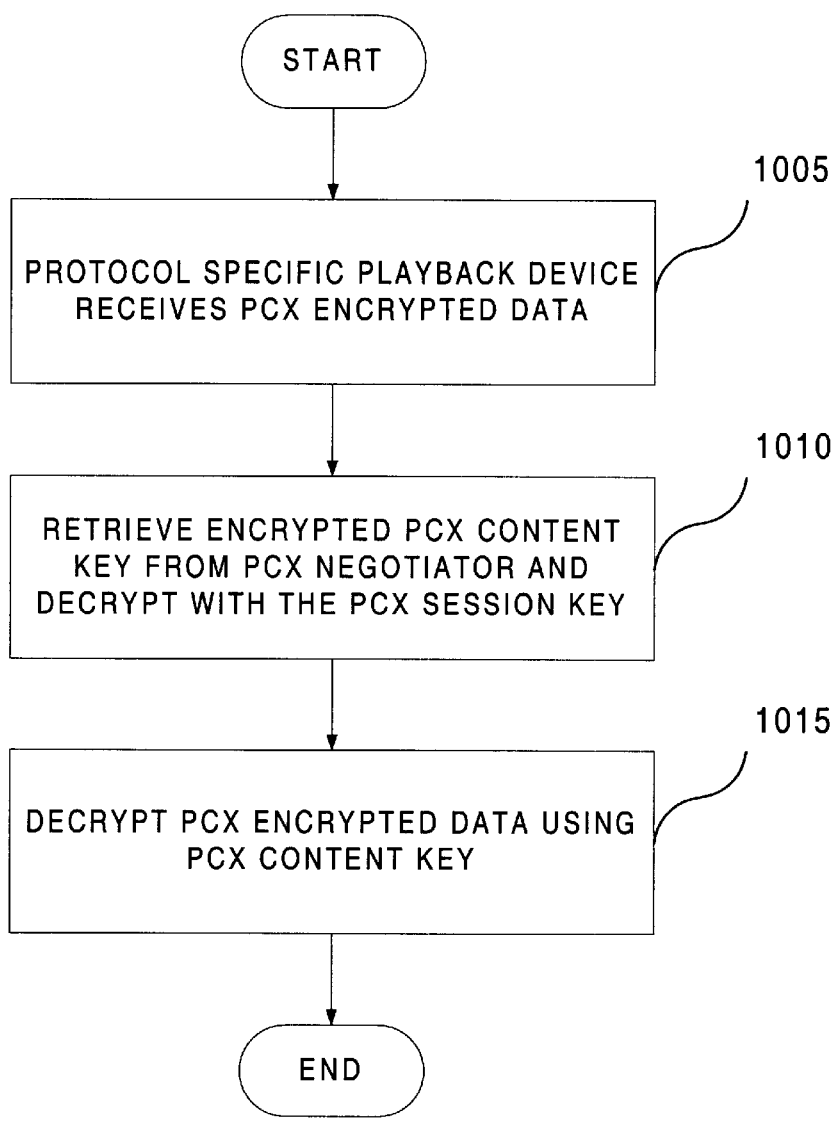
FIG. 10 is a flow diagram of one embodiment for decrypting PCX encrypted data by a decoding device.

FIG. 10 is a flow diagram of one embodiment for decrypting reencrypted data by decoding device 102. Referring to FIG. 10, decoding device 102 receives reencrypted data at processing block 1005.

At processing block 1010, decoding device 102 retrieves the encrypted PCX content key from PCX negotiator 328. If decoding device 102 is not registered, PCX negotiator 328 registers the protocol device 102 and negotiates the PCX session key for the protocol device 102.

At processing block 1015, decoding device 102 decrypts the reencrypted data using the PCX content key.

Figure 11:
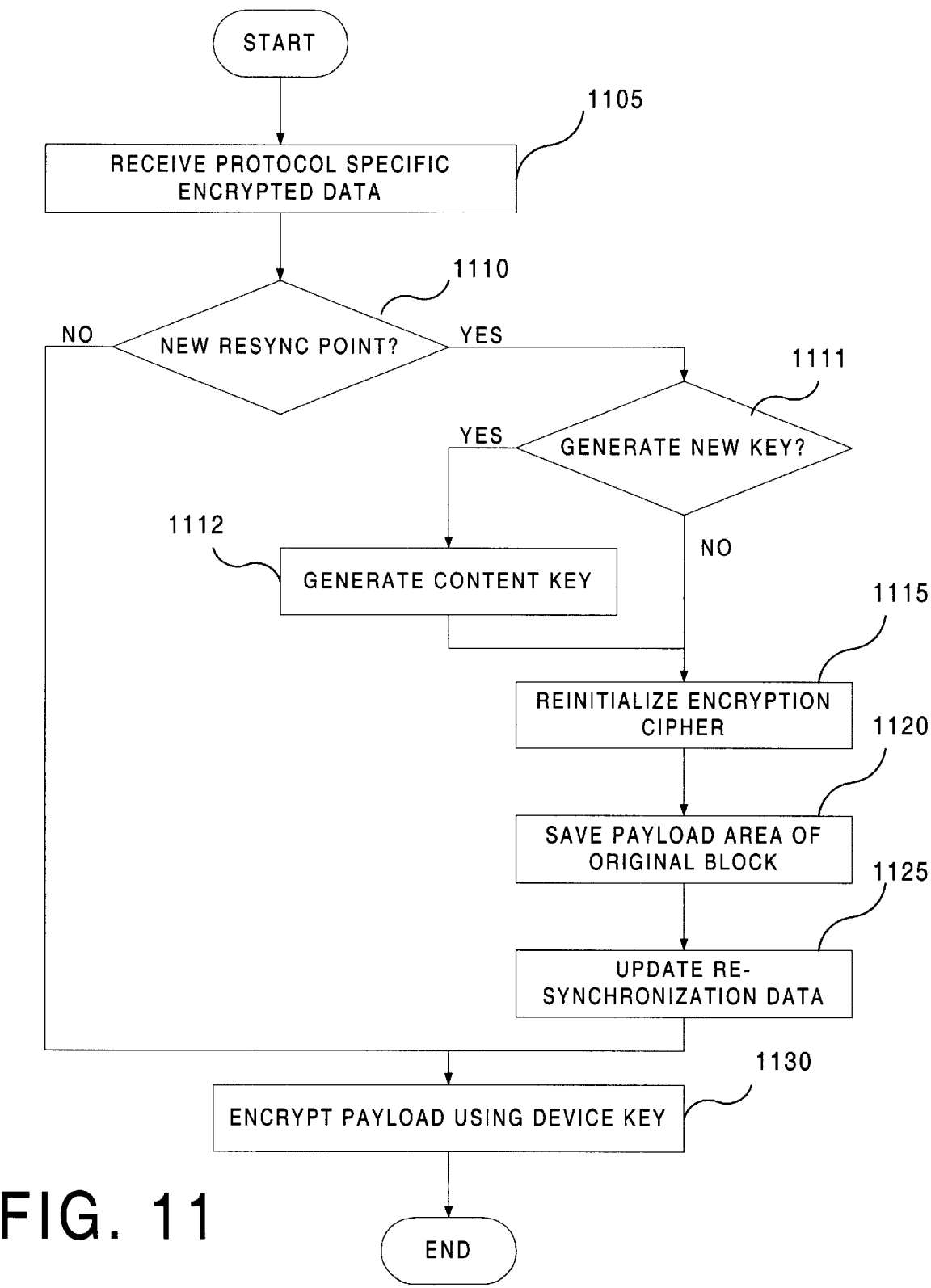
FIG. 11 is a flow diagram of one embodiment for creating a PCX resync block.

FIG. 11 is a flow diagram of one embodiment for creating a PCX resync block 720. Initially at processing block 1105, PCX module 106 receives protocol specific encrypted data. Next, at processing block 1110, PCX module 106 determines if a new resync point has been reached. If a new resync point has not been reached, processing continues at processing block 1130. If a new resync block has been reached, processing continues at block 1111.

At processing block 1111, PCX module 106 determines if PCX content key needs to be generated. If no new PCX content key needs to be generated, processing continues at processing block 1115. However, if a new PCX content key needs to be generated, processing continues at processing block 1112.

At processing block 1112, the new PCX content key is generated. PCX module 106 uses the existence of natural synchronization points within the original data stream to determine when to create a new PCX content key.

At processing block 1115, PCX module 106 generates PCX tag 610 that is a unique identification for the PCX resync block 720. In one embodiment, PCX tag 610 may be an array index value. In alternate embodiments, PCX tag 610 may be any suitable index value to the PCX resync block 720. At processing block 1120, PCX module 106 copies PCX flag 609, PCX tag 610, TSID 612, and PID 614 into the payload portion of the data stream and saves the original portion in location 820 in the resync block 720.

At processing block 1125, PCX module 106 updates PCX resync data 720. If the PCX content key being used to encrypt the payload is different from the PCX content key used on the previous block for the same decoding device 102, key delta tag 810 is incremented. Otherwise, key delta tag 810 is unchanged. In this manner, PCX content keys may be changed periodically during reencryption of the data. This increases the security of the data within system 100. In one embodiment, PCX content key is changed on a fixed time interval or after a fixed number of PES headers 608 have been processed.

In order to increase the security of system 100, the PCX content key is altered on each PES header 608 change by using a random initialization vector as a seed value to modify the key. This allows splitter 232 to drop a data block without losing the ability to decrypt the remaining data in the input stream. In one embodiment, key delta tag 810 and random initialization vector 815 are not encrypted. PCX content key 714 is encrypted with the previously negotiated PCX session key.

At processing block 1130, PCX module 106 encrypts the payload containing the resync data using the PCX content key.

Figure 12:
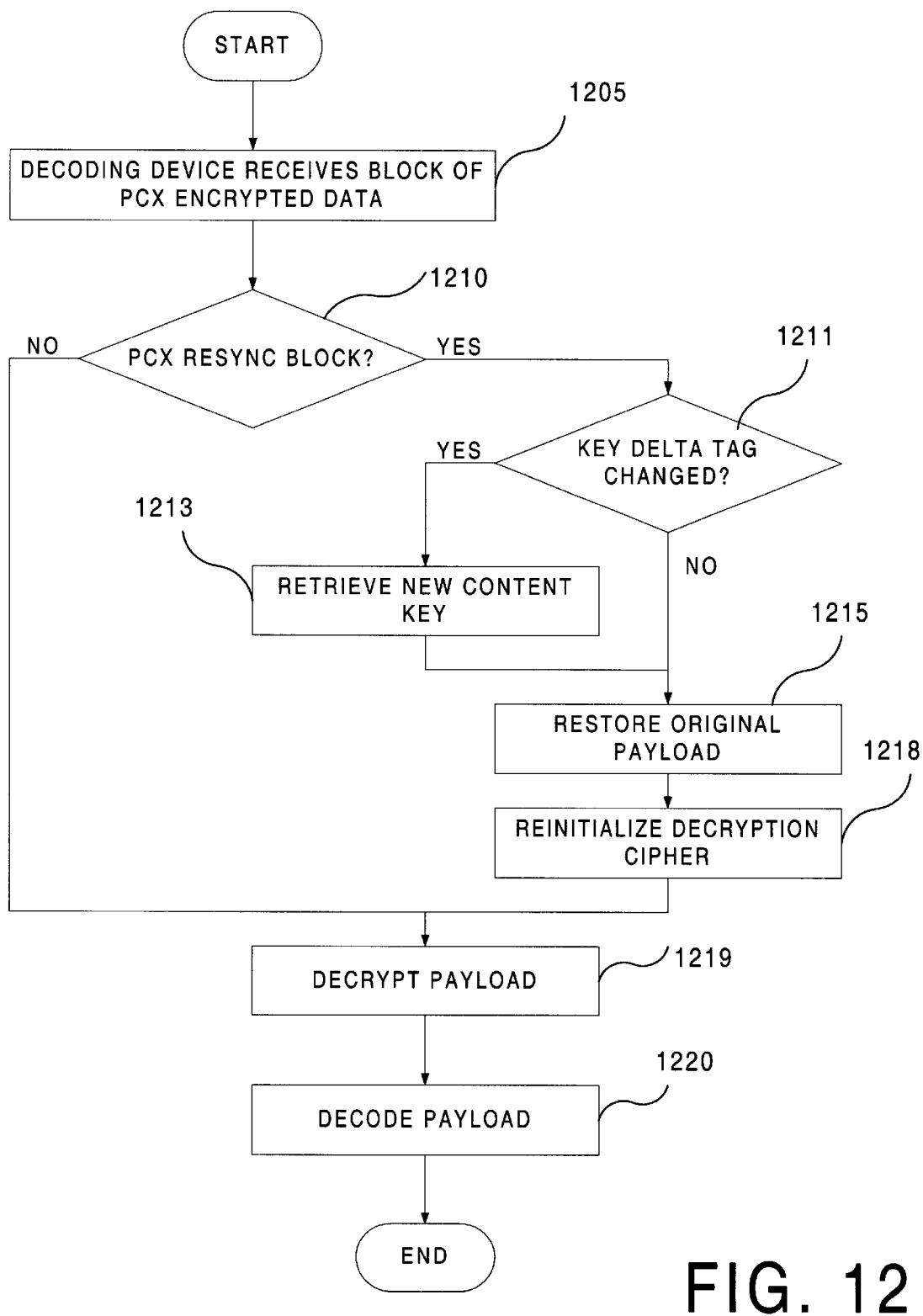
FIG. 12 is a flow diagram of one embodiment for decrypting a PCX resync block.

FIG. 12 is a flow diagram of one embodiment for decrypting a PCX resync block 720. Initially at processing block 1205, decoding device 102 receives a block of PCX encrypted data. At processing block 1210, decoding device 102 decrypts the payload and determines if the block of data is a resync block. If not, processing continues at step 1219. If the block of data is a resync block, processing continues at block 1211.

At processing block 1211, decoder 102 checks if key delta tag 810 changed. Delta tag 810 indicates if PCX content key has changed. If so, at processing block 1213, decoding device 102 retrieves PCX content key 714 from shared buffer 700.

At processing block 1215, decoding device 102 extracts PCX tag 610 and performs a look-up of the resync block 720 within shared buffer 700. Decoding device 102 restores the original payload.

Decoding device 102 then decrypts the PCX content key using the previously negotiated PCX session key. At processing block 1218, decoder 102 reinitializes the decryption cipher using the PCX content key and the random initialization vector 815.

At processing block 1219, decoder 102 decrypts the payload using the decryption cipher. At processing block 1220, the decoding device 102 decodes the payload of the unencrypted data for further processing (for example, playback by MPEG decoder).

The protocol specific data may contain copy control information (CCI) which allows the content owners to assign varying levels of priority for what can and can't be done with the data. The data may be "copy free" which means there is no restriction to copying the data. The other end of the spectrum is "copy never" which means that as soon as the AKE is negotiated, a device must render the data immediately. In this scheme, a device can not make any copies, can not save the data for later use, or anything similar. Thus, when a device receives the data, it is sent to the consumer, and then the data gets thrown away.

The other two schemes are "copy once" and "copy no more." If a device receives data that is marked as "copy once," the device may make a single copy of the data if the user chooses to do so. This scheme allows recording for later viewing. When a device receives data that is marked "copy once," the device may save it, but then once it is saved, when it is retrieved after saving, the device must mark the data as "copy no more."

In one embodiment, during transfer of data within system 100, if the data is unencrypted, the CCI information is susceptible to interception and unauthorized change. Thus, if the data is marked "copy never" and the information is hacked, the data may be pirated within system 100. The CCI information is contained within transmission header 602. The transmission header 602 is not encrypted during transfer though system 100 and is susceptible to change.

Within system 100, the CCI information is built into the PCX content key. The CCI information retrieved from the data stream in transmission header 602 is used as part of the seed to generate the key. Thus, by combining the PCX content key with the control information before reencryption, system 100 guarantees that any modification of the CCI information in the transmission header 602 will result in incorrect decryption of the protected data. During decryption of the reencrypted data by decoding device 102, the CCI information is extracted from the transmission header 602 and combined with the PCX content key to create the decryption key.

The above method may be used to protect any information embedded within the transmission header 602. Thus, information such as, for example, copy quality which may indicate the quality of audio a user is allowed to copy, how many times a device is allowed to copy this content, and similar information may be protected from change while the data is transferred within system 100.

Figure 13:
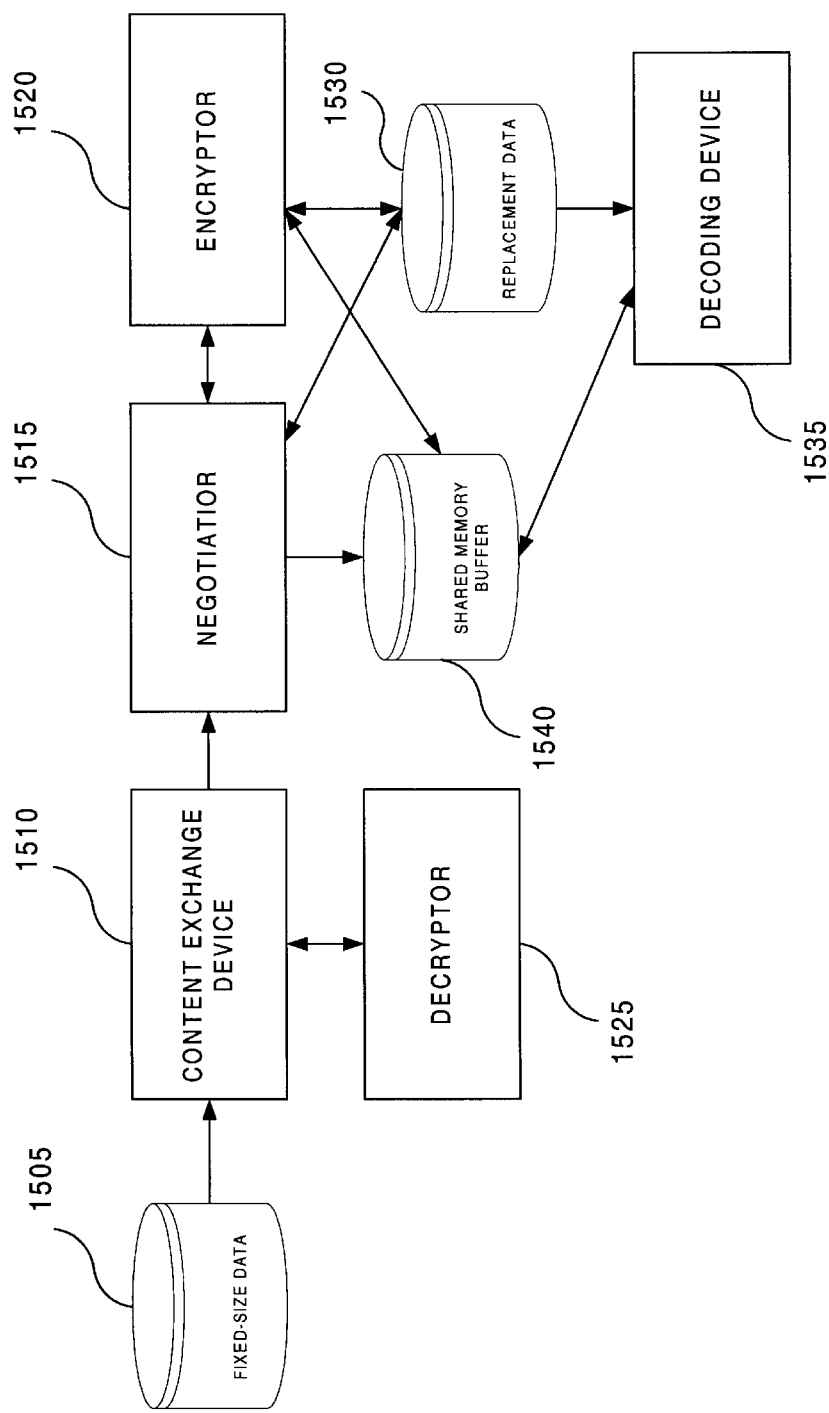
FIG. 13 is a block diagram of one embodiment for an information synchronizing system.

FIG. 13 is a block diagram of one embodiment for an information synchronizing system 1500. Content exchange device 1510 is configured to receive fixed-size data 1505. Content exchange device 1510 is further configured to save a portion of the original payload of the fixed-size data 1505 in shared memory buffer 1540 and configured to save synchronization information together with the original portion in shared memory buffer 1540. In one embodiment, decryptor 1525 is configured to decrypt fixed-length data 1505 as it is received by content exchange device 1510. Negotiator 1515 is configured to embed a tag to the appropriate synch block in shared memory buffer 1540 within a payload area of the fixed-size data 1505 to produce replacement data 1530. In one embodiment, encryptor 1520 is configured to encrypt the payload of replacement data 1530 and configured to encrypt the original payload saved in shared memory buffer 1540.

Decoding device 1535 is configured to extract the embedded tag from replacement data 1530 and to retrieve the original payload and synchronization information from shared memory buffer 1540 corresponding to replacement data 1530.

In one embodiment, decoding device 1535 is contained within the same device as shared memory buffer 1540. In an alternate embodiment, decoding device 1535 is a separate device from the device containing shared memory buffer 1540.

The specific arrangements and methods herein are merely illustrations of the principles of this invention. Numerous modifications in form and detail may be made by those skilled in the art without departing from the true spirit and scope of the invention.

What is claimed is:

1. A method of safeguarding data within a device, comprising:
   receiving at least one protocol specific encrypted data stream;
   translating the at least one protocol specific encrypted data stream into a protected content exchange (PCX) encrypted data stream;
   transferring the PCX encrypted data stream to a decoding device; and
   decrypting the PCX encrypted data stream.

2. The method of claim 1 wherein receiving further comprises:
   retrieving a content channel encryption key corresponding to a protocol specific bus.

3. The method of claim 1 wherein translating further comprises:
   decrypting the at least one encrypted data stream using a content channel encryption key to produce at least one decrypted data stream; and
   encrypting a payload portion of the at least one decrypted data stream using a PCX content key to produce the PCX re-encrypted data stream.

4. The method of claim 3 wherein encrypting further comprises:
   determining if a new PCX content key has been generated; and
   if a new PCX content key has been generated,
      saving a portion of an original payload of the at least one decrypted data stream in a shared memory buffer, and
      building a new payload within the at least one decrypted data stream.

5. The method of claim 3 further comprising:
   if the at least one decoding device is not registered,
      registering the at least one decoding device, and
      negotiating a PCX session key for the least one decoding device.

6. The method of claim 1 wherein translating further comprises:
   receiving the encrypted data stream, the data stream comprising at least one block of encrypted data;
   decrypting the at least one block of data using a content channel encryption key;
   determining if a new PCX content key has been generated;
   if a new PCX content key has been generated,
      saving a portion of an original payload of the at least one block of data in a shared memory buffer, and
      building a new payload within the at least one block of data; and
   encrypting the payload of the block of data using the PCX content key to create the PCX encrypted data.

7. The method of claim 6 further comprising:
   receiving at least one block of encrypted data by the at least one decoding device;
   determining if the at least one block of data is a PCX resync block; and
   if the block is a PCX resync block, restoring the original payload to the data block from the shared memory buffer.

8. A method of safeguarding data within a device, comprising:
   receiving at least one encrypted data stream comprising at least one block of encrypted data by at least one decoding device, the at least one block of encrypted data contains an embedded tag;
   retrieving a protocol content exchange (PCX) content key from a protocol specific negotiator corresponding to the embedded tag; and
   decrypting the at least one block of data with the PCX content key.

9. A method of safeguarding data within a device, comprising:
   receiving an encrypted data stream comprising at least one block of encrypted data, the at least one block of encrypted data is encrypted for a protocol specific bus;

decrypting the at least one block of data using a content channel encryption key;

determining if a new content key has been generated;

if a new content key has been generated,
saving a portion of an original payload of the at least one block of data in a shared memory buffer, and
building a new payload within the at least one block of data; and encrypting the payload of the block of data using the content key.

10. The method of claim 9 further comprising:

receiving at least one block of encrypted data by the at least one decoding device;

determining if the at least one block of data is a resync block;

if the block is a resync block, restoring the original payload to the data block; and decrypting the data block.

11. A method of safeguarding data within a device, comprising:

receiving at least one protocol specific encrypted data stream corresponding to at least one decoding device;

retrieving a content channel encryption key corresponding to a protocol specific bus;

decrypting the at least one encrypted data stream using the content channel encryption key to produce at least one decrypted data stream;

if the at least one decoding device is not registered, registering the at least one decoding device, and
negotiating a session key for the least one decoding device;

encrypting at least one payload portion of the at least one decrypted data stream using a randomly generated content key to produce a re-encrypted data stream;

encrypting the randomly generated content key with the session key;

transferring the re-encrypted data stream to the at least one decoding device;

transferring the encrypted content key to the at least one decoding device;

decrypting the content key corresponding to the re-encrypted data stream; and decrypting the re-encrypted data stream using the content key.

12. The method of claim 11 wherein encrypting further comprises:

determining if a new content key has been generated;

if a new content key has been generated,
saving an original payload of the at least one decrypted data stream in a shared memory buffer, and
building a new payload within the at least one decrypted data stream.

13. An article of manufacture including one or more computer-readable media with executable instructions therein, which, when executed by a processing device causes the processing device to:

receive at least one protocol specific encrypted data stream;

translate the at least one protocol specific encrypted data stream into a protected content exchange (PCX) encrypted data stream;

transfer the PCX encrypted data stream to a decoding device; and decrypt the PCX encrypted data stream.

14. The media of claim 13 wherein to receive further comprises:

retrieve a content channel encryption key corresponding to a protocol specific bus.

15. The media of claim 13 wherein to translate further comprises:

decrypt the at least one encrypted data stream using a content channel encryption key to produce at least one decrypted data stream; and encrypt a payload portion of the at least one decrypted data stream using a PCX content key to produce the PCX re-encrypted data stream.

16. The media of claim 15 wherein to encrypt further comprises:

determine if a new PCX content key has been generated; and if a new PCX content key has been generated,
save a portion of an original payload of the at least one decrypted data stream in a shared memory buffer, and
build a new payload within the at least one decrypted data stream.

17. The media of claim 15 further configured to:

if the at least one decoding device is not registered,
register the at least one decoding device, and
negotiate a PCX session key for the least one decoding device.

18. The media of claim 13 wherein to translate further comprises:

receive the encrypted data stream, the data stream comprising at least one block of encrypted data;

decrypt the at least one block of data using a content channel encryption key;

determine if a new PCX content key has been generated;

if a new PCX content key has been generated,
save a portion of an original payload of the at least one block of data in a shared memory buffer, and
build a new payload within the at least one block of data; and encrypt the payload of the block of data using the PCX content key to create the PCX encrypted data.

19. The media of claim 18 further configured to:

receive at least one block of encrypted data by the at least one decoding device;

determine if the at least one block of data is a PCX resync block; and if the block is a PCX resync block, restore the original payload to the data block from the shared memory buffer.

20. An article of manufacture including one or more computer-readable media with executable instructions therein, which, when executed by a processing device causes the processing device to:

receive at least one encrypted data stream comprising at least one block of encrypted data by at least one decoding device, the at least one block of encrypted data contains an embedded tag;

retrieve a protocol content exchange (PCX) content key from a protocol specific negotiator corresponding to the embedded tag; and decrypt the at least one block of data with the PCX content key.

21. An article of manufacture including one or more computer-readable media with executable instructions therein, which, when executed by a processing device causes the processing device to:
- receive an encrypted data stream comprising at least one block of encrypted data, the at least one block of encrypted data is encrypted for a protocol specific bus;
- decrypt the at least one block of data using a content channel encryption key;
- determine if a new content key has been generated;
- if a new content key has been generated,
    - save a portion of an original payload of the at least one block of data in a shared memory buffer, and
    - build a new payload within the at least one block of data; and
- encrypt the payload of the block of data using the content key.

22. The media of claim 21 further configured to:
- receive at least one block of encrypted data by the at least one decoding device;
- determine if the at least one block of data is a resync block;
- if the block is a resync block, restore the original payload to the data block; and decrypt the data block.

23. An article of manufacture including one or more computer-readable media with executable instructions therein, which, when executed by a processing device causes the processing device to:
- receive at least one protocol specific encrypted data stream corresponding to at least one decoding device;
- retrieve a content channel encryption key corresponding to a protocol specific bus;
- decrypt the at least one encrypted data stream using the content channel encryption key to produce at least one decrypted data stream;
- if the at least one decoding device is not registered, register the at least one decoding device, and negotiate a session key for the least one decoding device;
- encrypt at least one payload portion of the at least one decrypted data stream using a randomly generated content key to produce a re-encrypted data stream;
- encrypt the randomly generated content key with the session key;
- transfer the re-encrypted data stream to the at least one decoding device;
- transfer the encrypted content key to the at least one decoding device;
- decrypt the content key corresponding to the re-encrypted data stream; and
- decrypt the re-encrypted data stream using the content key.

24. The media of claim 23 wherein to encrypt further comprises:
- determine if a new content key has been generated;
- if a new content key has been generated,
    - save an original payload of the at least one decrypted data stream in a shared memory buffer, and
    - build a new payload within the at least one decrypted data stream.

25. A system for safeguarding data within a device, comprising:
- means for receiving at least one protocol specific encrypted data stream;
- means for translating the at least one protocol specific encrypted data stream into a protected content exchange (PCX) encrypted data stream;
- means for transferring the PCX encrypted data stream to a decoding device; and
- means for decrypting the PCX encrypted data stream.

26. A system for safeguarding data within a device, comprising:
- means for receiving at least one encrypted data stream comprising at least one block of encrypted data by at least one decoding device, the at least one block of encrypted data contains an embedded tag;
- means for retrieving a protocol content exchange (PCX) content key from a protocol specific negotiator corresponding to the embedded tag; and
- means for decrypting the at least one block of data with the PCX content key.

27. A system for safeguarding data within a device, comprising:
- means for receiving an encrypted data stream comprising at least one block of encrypted data, the at least one block of encrypted data is encrypted for a protocol specific bus;
- means for decrypting the at least one block of data using a content channel encryption key;
- means for determining if a new content key has been generated;
- if a new content key has been generated,
    - means for saving a portion of an original payload of the at least one block of data in a shared memory buffer, and
    - means for building a new payload within the at least one block of data; and
- means for encrypting the payload of the block of data using the content key.

28. A system for safeguarding data within a device, comprising:
- at least one protocol specific encrypted data stream;
- a protected content exchange (PCX) device configured to translated the at least one protocol specific encrypted data stream into a PCX encrypted data stream; and
- at least one decoder configured to decode the PCX encrypted data stream.

29. The system of claim 28 wherein the PCX device further comprises:
- at least one protocol specific registration engine configured to register the least one decoder;
- at least one negotiator configured to negotiate at least one device key for the least one decoder;
- at least one decryptor configured to decrypt the at least one protocol specific encrypted data stream; and
- at least one encryptor configured to encrypt a payload portion of the decrypted data stream using the at least one device key to produce at least one re-encrypted data stream.

30. The system of claim 29 further comprising:
- at least one device specific port driver configured to route the at least one protocol specific encrypted data stream to the least one decoder;
- at least one bus abstractor configured to extract protocol specific data blocks from the at least one protocol specific encrypted data stream; and
- at least one splitter configured to split the at least one re-encrypted data stream into at least one device specific data stream and to send the at least one device specific data stream to the at least one decoder.

31. The system of claim 29 wherein the at least one negotiator is further configured to responsively provide the at least one device key to the least one decoder.

32. A method of synchronizing information within a fixed-size data stream, the method comprising:

receiving the fixed-sized data stream, the fixed-sized data stream comprising at least one block of data;

saving an original payload of the at least one block of data in a shared memory buffer;

saving synchronization information together with the original payload;

embedding a key to the original payload within a payload area of the at least one block of data to produce at least one replacement block of data; and transferring the at least one replacement block of data to a receiving device.

33. The method of claim 32 further comprising:

retrieving the original payload and synchronization information using the key.

34. The method of claim 33 further comprising:

extracting the embedded key from the at least one replacement block of data.

35. The method of claim 32 further comprising:

encrypting the payload area of the at least one replacement block of data.

36. The method of claim 32 further comprising:

decrypting the at least one block of data; and encrypting the original payload within the shared memory.

37. An article of manufacture including one or more computer-readable media with executable instructions therein, which, when executed by a processing device causes the processing device to:

receive the fixed-sized data stream, the fixed-sized data stream comprising at least one block of data;

save an original payload of the at least one block of data in a shared memory buffer;

save synchronization information together with the original payload;

embed a key to the original payload within a payload area of the at least one block of data to produce at least one replacement block of data; and transfer the at least one replacement block of data to a receiving device.

38. The media of claim 37 further configured to:

retrieve the original payload and synchronization information using the key.

39. The media of claim 38 further configured to:

extract the embedded key from the at least one replacement block of data.

40. The media of claim 37 further configured to:

encrypt the payload area of the at least one replacement block of data.

41. The media of claim 37 further configured to:

decrypt the at least one block of data; and encrypt the original payload within the shared memory.

42. A system for synchronizing information within a fixed-size data stream, the system comprising:

means for receiving the fixed-sized data stream, the fixed-sized data stream comprising at least one block of data;

means for saving an original payload of the at least one block of data in a shared memory buffer;

means for saving synchronization information together with the original payload;

means for embedding a key to the original payload within a payload area of the at least one block of data to produce at least one replacement block of data; and means for transferring the at least one replacement block of data to a receiving device.

43. A system for synchronizing information within a fixed-size data block, the system comprising:

a content exchange device configured to save an original payload of the fixed-size data block in a shared memory buffer, and configured to save synchronization information together with the original payload; and at least one negotiator configured to embed a key to the original payload within a payload area of the fixed-size data block to produce at least one replacement data block.

44. The system of claim 43 further comprising:

at least one decoding device configured to extract the embedded key from the replacement block and configured to retrieve the original payload and synchronization information using the key.

45. The system of claim 43 further comprising:

at least one encryptor configured to encrypt the payload of the replacement block and to encrypt the original payload within the shared memory.

46. The system of claim 43 further comprising:

at least one decryptor configured to decrypt the fixed-size data block.

* * * * *